US010708662B1

(12) United States Patent
Bourgoyne

(10) Patent No.: US 10,708,662 B1
(45) Date of Patent: Jul. 7, 2020

(54) CUSTOMIZED STREAMING OF DIGITAL CONTENT

(71) Applicant: Amazon Technologies, Inc., Seattle, WA (US)

(72) Inventor: David Wayne Bourgoyne, Fall City, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 15/945,297

(22) Filed: Apr. 4, 2018

(51) Int. Cl.
*H04N 21/4722* (2011.01)
*H04N 21/81* (2011.01)
*H04N 21/84* (2011.01)
*H04N 21/435* (2011.01)
*H04N 21/2187* (2011.01)

(52) U.S. Cl.
CPC ..... *H04N 21/4722* (2013.01); *H04N 21/2187* (2013.01); *H04N 21/435* (2013.01); *H04N 21/8133* (2013.01); *H04N 21/84* (2013.01)

(58) Field of Classification Search
None
See application file for complete search history.

(56) References Cited

U.S. PATENT DOCUMENTS

2004/0197088 A1* 10/2004 Ferman ................ G06F 3/0481
386/251
2016/0323610 A1* 11/2016 Lin .................... H04N 21/2187

* cited by examiner

*Primary Examiner* — Nathan J Flynn
*Assistant Examiner* — Christen A Kurien
(74) *Attorney, Agent, or Firm* — Kilpatrick Townsend & Stockton LLP

(57) ABSTRACT

Described herein are systems and methods for selectively determining a set of segments of a live content stream to present at a user device to overcome a delay in the live content stream. A content manifest may be accessed that identifies locations of the segments of the set. Tagging information may be accessed that identifies action segments and other segments of the set. The set of segments can be determined based at least in part on the content manifest and the tagging information. The set of segments may be discontinuous in an unaltered stream, but may be presented continuously in a customized stream.

20 Claims, 9 Drawing Sheets

CUSTOMIZED STREAMING OF DIGITAL CONTENT

BACKGROUND

In recent years, live streaming of digital content over the Internet and/or other networks has become more common. For example, sporting events can be streamed to one's mobile device over a cellular network or to a media player connected to a display over the Internet. In a typical streaming arrangement, a live feed is captured, processed, and broken into a series of time continuous files. Depending on system latency, these files are shared with or otherwise made accessible to a player device in about real time as a series of downloads. The player devices put the continuous files back together in the same order and sequence they were captured to recreate the live feed.

Following the conclusion of some live events, a single content file may generated and made available for downloading and/or for streaming in a similar manner (e.g., as a series of time continuous files).

BRIEF DESCRIPTION OF THE DRAWINGS

Various examples in accordance with the present disclosure will be described with reference to the drawings, in which.

DETAILED DESCRIPTION

Figure 1:
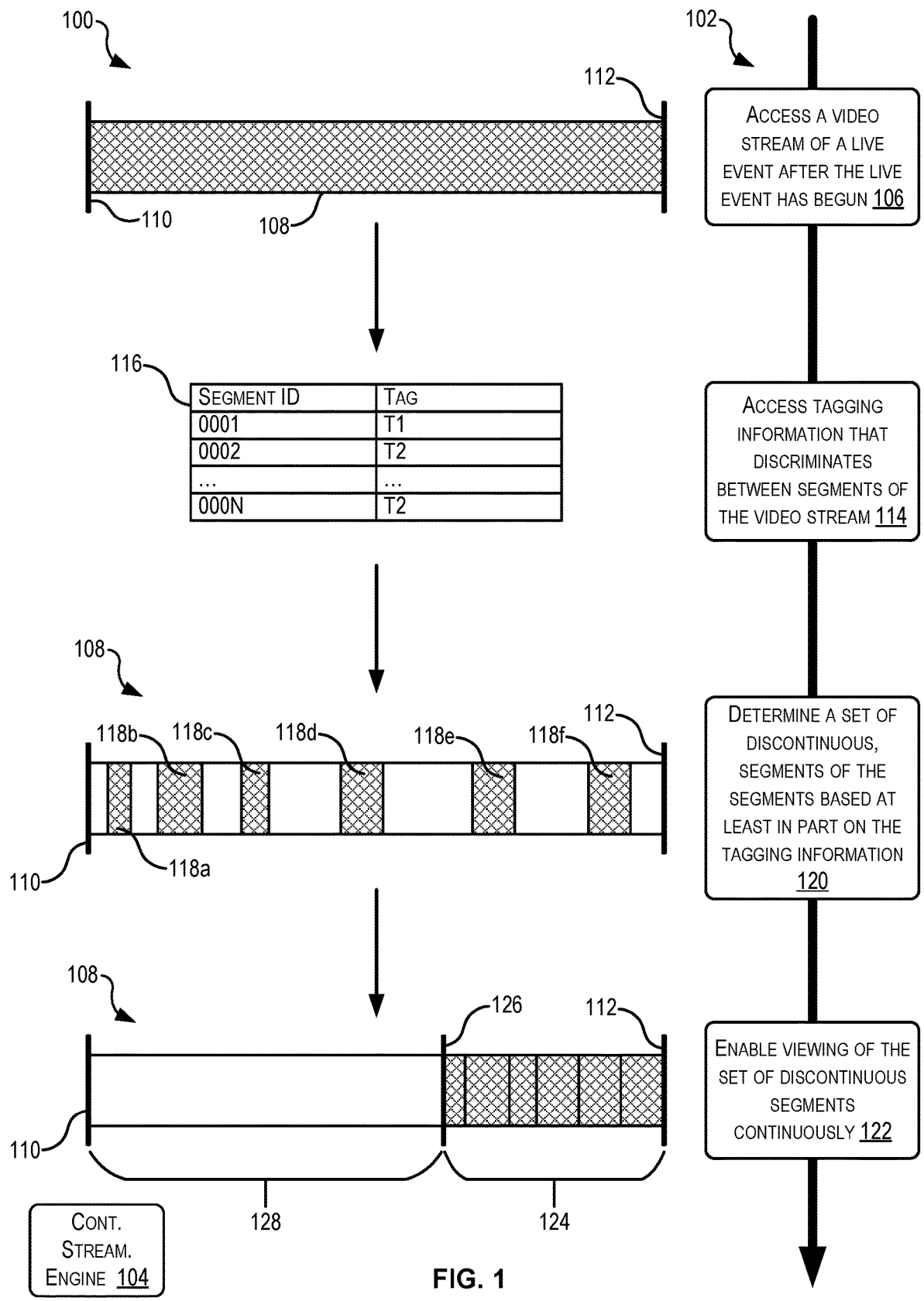
FIG. 1 is an example block diagram and associated flowchart showing a process for implementing techniques relating to customized streaming of digital content, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to, among other things, techniques for customized streaming of streaming digital content (e.g., live content). In particular, techniques described herein may provide a process for delivering a shortened customized stream of a live event in a manner that allows a user to "catch up" to a live point in a live stream (e.g., before the live event ends). For example, after the live event has begun, the user may select an option on her user device to watch the live stream in a catch-up mode. In this mode, the user device communicates with a service provider to selectively download and present tagged content segments of the stream (e.g., frames or sets of frames). In some examples, a segment of a stream includes a chunk of data that is fully decodable on its own. Each segment may be associated with one or more tag, and a single tag may be associated with more than one segment.

The service provider tags the segments of the stream based on one or more tagging schema using one or more tags. For example, in a live sporting event, a tagging scheme may define which parts of the sporting event constitute action that the user would be interested in seeing and which parts may be ignored (e.g., because they are less relevant to the progress of the sporting event). Because the action parts of the sporting event will likely be discontinuous in time with respect to each other (e.g., an action part may fall in between two less relevant parts), the user device can build its own customized stream by downloading and playing only the action segments. This results in the user being able to catch up to the live stream very quickly. For example, using the techniques described herein, a stream of a first half of an America football game may be condensed from one and half hours to ten or fifteen minutes. Because the user device selectively downloads only the segments it needs to build the customized stream, bandwidth savings are realized at the user device, not to mention that demand on the service provider and/or a content delivery network associated with the service provider is reduced because fewer bits of data are being transferred. Additionally, battery life of a battery-operated user device is conserved for similar reasons.

Turning now to a particular example, a system is provided that includes a user device, a service provider, and a tagging service. As a live stream of a basketball game is obtained by the service provider, the tagging service, which can include a user interface for a human to tag the live stream or an artificial intelligence component to tag the live stream, is used to tag or otherwise annotate action segments of the live stream. For example, action segments may include attempted shots, rebounds, put-backs, free throw shots, steals, etc. Other segments, e.g., inbound plays, dribbling the ball down court, timeouts, free throw shot setups, etc., may also be tagged using their own tag (e.g., non-action tags) or may not be tagged at all. After the live event has begun, the user device is used to request to view the stream from a delayed point to the live point (e.g., to catch up to the live stream). In response, the service provider sends a content manifest that identifies the segments (e.g., action segments alone or action segments and other segments) and tagging information that maps the applied tags to the segments on the content manifest. The user device uses the content manifest and the tagging information to select which segments (e.g., those tagged with action tags) to download to build the customized stream. By virtue of the tagging information, the downloaded action segments will likely be discontinuous in time with respect to each other. Once downloaded, the user device enables presentation of the discontinuous action segments continuously. This may mean that the segments are presented sequentially (e.g., one after another), but with gaps of content as compared to the complete live stream. These gaps correspond to the non-action segments that were either not downloaded or otherwise ignored by the user device. In this manner, a customized and condensed stream of the basketball game can be provided to the user device. In some examples, other segments such as required commercial segments, transition segments, and other segments (e.g., color commentary), may be inserted into the customized and condensed stream. In some examples, the discontinuous action segments along with these other segments may be presented continuously.

In some examples, processing a video stream, identifying segments, tagging segments, etc. is performed by the service provider. In this example, instead of the user device deciding which segments to download, the user device can provide a request for content that includes user preferences (e.g., that indicate what types content a user prefers). Based on this request, the service provider can determine an appropriate set of segments for delivery to the user device. The service provider can send the set of segments to the user device and/or send information (e.g., content manifest) that instructs the user device from where to access the set of segments.

In some examples, users may update user settings to define user preferences for a particular type and/or sub-type of a live event that results in a customized stream for the particular type and/or particular sub-type of the live event. For example, a sporting events is a type of live event, and golf, football, baseball, basketball, etc. are examples of a sub-type of live event. Similarly, Olympic games is a type of live event, and archery, badminton, boxing, cycling, diving, etc. are examples of a sub-type of live event. Of course, the specification should not be limited to sport type live events as the same principles can be applied to any live event (e.g., reality television episode, presidential debates, parades, countdown shows, etc.). In some examples, users may update settings to define user preferences that correspond to a sliding scale of action. For example, the user may desire to see more action in a football game in which their favorite team—the Seahawks—is playing and see less action in a football game in which their least favorite team—the Patriots—is playing. In this manner, what is considered action content or otherwise interesting content can be refined to a fine degree of granularity based on user preferences.

The techniques described herein improve the functioning of computer systems that provide real-time streaming of content. In particular, because fewer files are required to produce the customized stream as compared to a real-time stream, bandwidth savings are realized. Additionally, use of tagging information in combination with a content manifest means that the same content manifest can be shared with users viewing the real-time stream and users viewing the customized stream (e.g., a stream in a catch-up mode). Because of this, computing resources (e.g., processing cycles) are conserved by the computer systems that manage the content manifests.

Additionally, as described in some examples, processing of tagging information in combination with a content manifest at a user device improves efficiency of using the user device and improves an overall user viewing experience. Such efficiency comes from the fact that viewing in the catch-up mode may only require a single user action (e.g., selection of an option to view in the catch-up mode). Additionally, because the catch-up mode is designed to catch up quickly, opportunities for the user to receive spoiler information is minimized (e.g., a message from a third party (e.g., from social media, phone notifications, neighbors, etc.) about action at the live event prior to viewing the action in the stream) thereby improving the user viewing experience. Thus, the user is not burdened by multiple clicks, prompts, or screens to access the catch-up mode or subjected to spoiler information.

For example, using audio/video equipment, live events such as sporting events can be digitally captured and streamed, broadcasted, or otherwise shared with viewing devices. With respect to streaming, there exist essentially three time-based scenarios for viewing a stream of a live event that has previously begun. For example, the user may first access the stream after the event has been underway for an hour. In a first scenario, a user users forwarding controls to manually speed up the stream (e.g., skip ahead in increments of 30 seconds) or uses a present speed multiplier (e.g., play at "3×" speed). Under this scenario, the user could be exposed to spoiler information about the event and, as an added downside, must continuously operate the forwarding controls or watch the stream at an increased speed. In a second scenario, the user can begin streaming the live event from the beginning without fast forwarding. Under this scenario and because of this delay, there is a high possibility that the user will receive spoiler information. Under a third scenario, the user can begin streaming the live event at a live point (e.g., utilize a "go live" option). For example, under this scenario, the past portion of the stream will be skipped. Under this scenario and because the user begins at the live point, the user may be insulated from spoiler information (because she is viewing a live stream), but as a result will miss out on all the action in the first hour of the event. Using the techniques described herein has the benefit of viewing the main action points in the event in a short period of time thereby minimizing the time that spoiler information could impact the user's viewing experience, while also removing the burden of control operation from the user. In this manner, the techniques described herein improve the user viewing experience and efficiency of using the user devices.

Turning now the figures, FIG. 1 is an example block diagram 100 and associated flowchart showing a process 102 for implementing techniques relating to customized streaming of digital content, according to at least one example. The diagram 100 depicts objects that correspond to the process 102. The process 102 can be performed by a customized streaming engine 104, which may be implemented in a user device and/or a server computer, to provide a catch-up mode for viewing a video stream 108.

The process 102 may begin at 106 by accessing the video stream 108 of a live event after the live event has begun. The video stream 108 may include a beginning point 110 and a live point 112. The live point 112 may be static (e.g., is fixed in time based on when the catch-up mode was entered) or may be dynamic (e.g., continue to move forward in time as the event progresses). The video stream 108 can be originally accessed by a service provider from a content originator (e.g., entity that captures the video at the live event). The access at 106 may relate to a user device requesting access to view a portion of the video stream 108.

At 114, the process 102 may include accessing tagging information 116 that discriminates between segments 118 of the video stream 108. The segments 118 of the video stream may be continuous in time with respect to each other. In some examples, the tagging information 116 may be included as part of a content manifest. The content manifest may be accessed at the same time as the tagging information and/or the content manifest may be accessed separately. In any event, the tagging information 116, which may be generated by the service provider or a third party entity, may associate a tag, an identifier, or other annotation with particular segments 118 of the video stream 108. As described herein, this process of tagging the segments 118 may be performed with respect to a tagging scheme that includes rules for which segments get which tags.

At 120, the process 102 may include determining a set of discontinuous segments 118a-118f of the segments 118 based at least in part on the tagging information 116. In some examples, the set of discontinuous segments 118a-118f include the particular segments that were identified in the tagging information as being action segments, of interest to the user, or otherwise desirable. Because the set of discontinuous segments 118a-188f excludes certain other segments (e.g., non-action, less interesting to the user, or otherwise less desirable), the set of discontinuous segments 118a-118f in total is much shorter in time than the complete video stream 108.

At 122, the process 102 may include enabling viewing of the set of discontinuous segments 118a-118f continuously. For example, the set of discontinuous segments 118a-118f may constitute a customized stream 124, with an effective beginning point 126 and the live point 112 as its ending point. As depicted in FIG. 1, the video stream 108 has been condensed into the customized stream 124 by disregarding portion 128. The portion 128 may include the other segments 118 that were excluded from the set of discontinuous segments 118a-118f. As described herein, catching up to the live video stream 108 may include performing the process 102 until a static live point 112 is reached or performing the process 102 until a dynamic live point 112 is reached.

Figure 2:
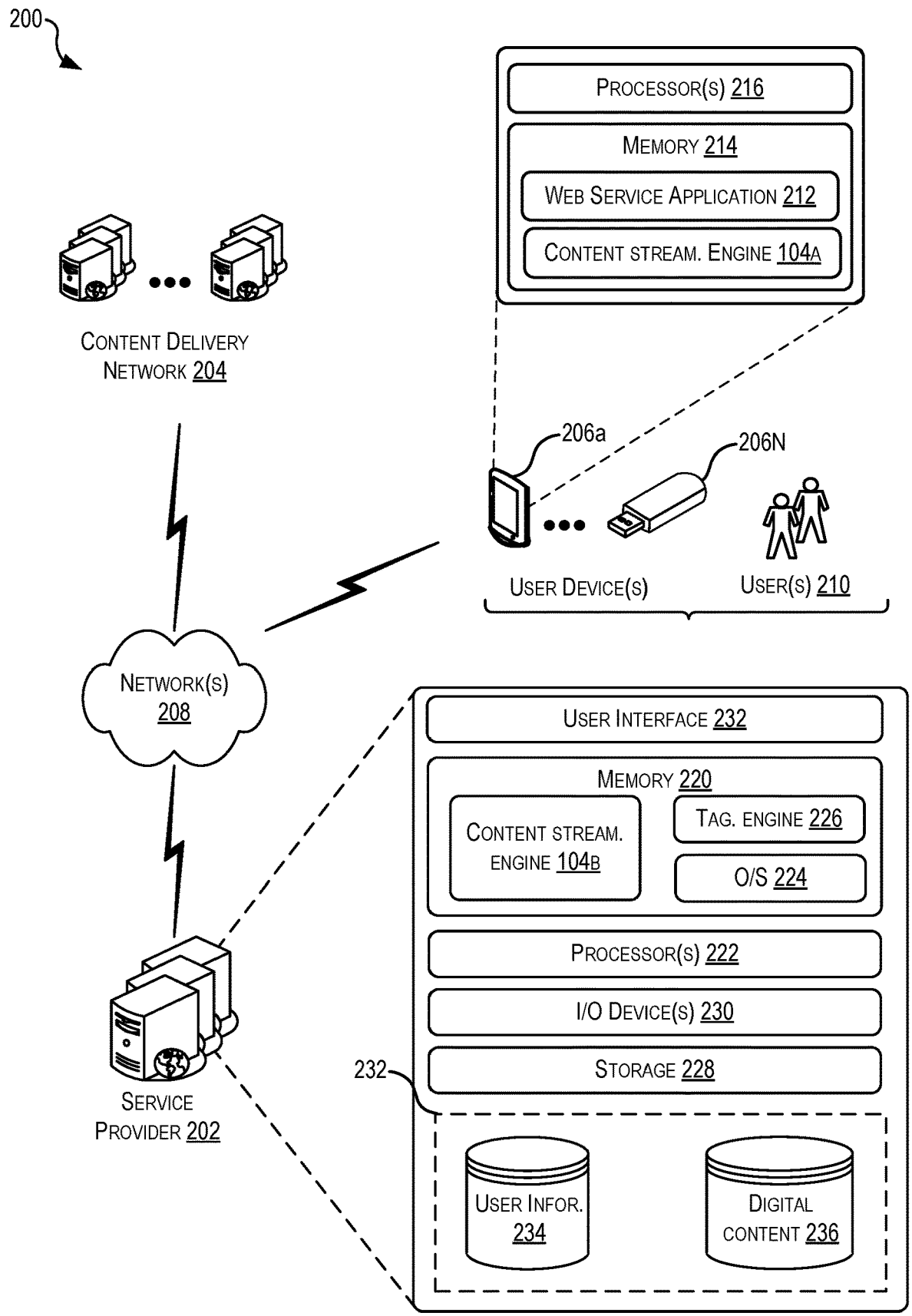
FIG. 2 is an example schematic architecture for implementing techniques relating to customized streaming of digital content, according to at least one example.

FIG. 2 is an example schematic architecture 200 for implementing techniques relating to customized streaming of digital content, according to at least one example. The architecture 200 may include a service provider 202 in communication with one or more user devices 206a-206N (hereinafter, "the user device 206") via one or more networks 208 (hereinafter, "the network 208"). The architecture 200 may also include a content delivery network 204 in communication with the user device 206 and the service provider 202 via the network 208.

The user device 206 may be operable by one or more users 210 (hereinafter, "the user 210") to interact with the service provider 202. In some examples, the user device 206 is in network communication with a local host device via a second network (not show) and/or a wired connection, both of which may be distinct from the network 208. For example, the local host device may be a network-enabled streaming device connected to a display that is controllable by one of the other user devices 206 or some other input device (e.g., a handheld controller). In some examples, electronic content items are streamed from the service provider 202 via the network 208 and the local host device to the user device 206.

The user device 206 may be any suitable type of computing device such as, but not limited to, a wearable device, a tablet, a mobile phone, a smart phone, a network-enabled streaming device (a high-definition multimedia interface ("HDMI") microconsole pluggable device), a personal digital assistant ("PDA"), a laptop computer, a desktop computer, a thin-client device, a tablet computer, a high-definition television, a web-enabled high-definition television, a set-top box, etc. For example, the user device 206a is illustrated as an example of a smart phone, while the user device 206N is illustrated as an example of a network-enabled streaming device.

The user device 206 may include a memory 216 and processor(s) 216. In the memory 214 may be stored program instructions that are loadable and executable on the processor(s) 216, as well as data generated during the execution of these programs. Depending on the configuration and type of user device 206, the memory 214 may be volatile (such as random access memory ("RAM")) and/or non-volatile (such as read-only memory (ROM), flash memory, etc.).

In some examples, the memory 214 may include a web service application 212 and a content streaming engine 104a. The web service application 212 and/or the content streaming engine 104a may allow the user 210 to interact with the service provider 202 via the network 208. Such interactions may include, for example, creating, updating, and managing user preferences associated with the user 210, any one of the user devices 206, and/or streaming content. For example, the user 210 may identify what types of content she finds interesting to be included in the customized streams. This may be done by the user 210 selecting from categories of actions and sub-actions, which may depend on the type of live event. For example, the user 210 may identify, in settings accessible by the service provider 202, the types of activities that user 210 finds interesting and/or would like to see in a customized stream of a baseball game. To capture these preferences, at the user device 206 can be presented a user interface that allows the user 210 to select from a set of predefined categories and sub-categories. Categories may include, for example, game play, color commentary, commercials, sideline interviews, etc. Sub-categories of game play may include, for example, strikes, balls, overthrown pitches, homeruns, hits, strikeouts, errors, singles, doubles, triples, double plays, triple plays, and any other sub-category related to game play. In this manner, the user 210 may have control over what content she is interested in seeing in her customized stream. Similar categories and sub-categories can also be applied to any other live event. For example, when viewing a live stream of a parade, the user preferences may cause only certain types of entrants to be viewed (e.g., view floats, but exclude marching bands). To enable customization at this level of granularity, the tagging service may tag content according to a tagging scheme based on tagging rules, which may depend on user preferences or other configurable parameters. For example, the tagging scheme can correspond to a set of predefined categories, sub-categories, and the like. In some examples, the tags may correspond to a predefined set of statistics that are recorded for a particular sporting event. Because these statistics are already being gathered in about real time, the tagging service can be used to associate the statistic with segment(s) in which the statistic was recorded. For example, in an American football game, statistics such as completed passes, sacks, incomplete passes, rushes, interceptions, touchdowns, tackle for loss, first down, etc. can correspond to tags such that the user 210 can customize her stream to her own preferences.

In some examples, the content streaming engine 104a enables the user to set the preferences described above that may be used to generate the customized streams. The content streaming engine 104a may also be used to implement the other techniques described herein including, for example, requesting a stream in catch-up mode, determining relevant segments of the stream, requesting those segments, and providing a customized stream for presentation at the user device 206 and/or at a display device associated with the user device 206.

Turning now to the details of the service provider 202, the service provider 202 may include one or more service provider computers, perhaps arranged in a cluster of servers or as a server farm, and may host web service applications.

The function of the service provider 202 may be implemented a cloud-based environment such that individual components of the service provider 202 are virtual resources in a distributed environment. These servers may be configured to host a website (or combination of websites) viewable on the user device 206. The service provider 202 also may be implemented as part of an electronic marketplace (not shown). In some examples, the service provider 202 may be configured to provide generic and customized digital content streams to the user devices 206. In some examples, the digital content streams are modified prior to be being provided to the user devices 206 (e.g., relevant segments are identified, bundled, and streamed to the user device 206). In some examples, the digital content streams are modified after being provided to the user devices 206 (e.g., the user device 206 identifies relevant segments, requests the segments, and provides them for display at the user device 206).

The service provider 202 may include at least one memory 220 and one or more processing units (or processor(s)) 222. The processor 222 may be implemented as appropriate in hardware, computer-executable instructions, software, firmware, or combinations thereof. Computer-executable instruction, software, or firmware implementations of the processor 222 may include computer-executable or machine-executable instructions written in any suitable programming language to perform the various functions described. The memory 220 may include more than one memory and may be distributed throughout the service provider 202. The memory 220 may store program instructions that are loadable and executable on the processor(s) 222, as well as data generated during the execution of these programs. Depending on the configuration and type of memory including the service provider 202, the memory 220 may be volatile (such as RAM and/or non-volatile (such as read-only memory ("ROM"), flash memory, or other memory). The memory 220 may include an operating system 224 and one or more application programs, modules, or services for implementing the features disclosed herein including at least the content streaming engine 104b and a tagging engine 226.

The tagging engine 226 may be used to generate tagging information and make the same available to requesting devices. For example, utilizing an interface 232, the tagging engine 226 may enable a human user to view and tag digital content in real time. In some examples, this may be referred to as a human-in-the-loop system in which human users, with the assistance of the user interface 232, tag segments. In one example, the tagging scheme may be binary (e.g., action vs. other) and therefore relatively simple. As described herein, in other examples, the tagging scheme may be more complex and require one of a multiple tags. In some examples, the tagging users may utilize any suitable user device such as one of the user devices 206 to access the service provider 202 and use the tagging engine 226 to tag digital content. In this example, the users may be third-party users, which may tag content on demand.

The tagging engine 226 may also be used to generate tagging information in an automated manner. For example, the tagging engine 226 may include an artificial intelligence component that is trained to recognize and tag segments of the digital content based on a set of rules. For example, the artificial intelligence component may be implemented using any suitable machine learning algorithm including those categorized as supervised learning (e.g., nearest neighbor, Naive Bayes, decision trees, linear regression, support vector machines, neural networks), unsupervised learning (e.g., K-means clustering), semi-supervised learning, or reinforcement learning (e.g., Q-Learning, temporal difference, deep adversarial networks). In this manner, the tagging engine 226 may be configured to programmatically generate tagging information.

In some examples, the tagging engine 226 may be configured to write and read data in a datastore 232. For example, the tagging information generated by the tagging engine 226 may be stored in one of the databases of the datastore 232. In some examples, the tagging engine 226 makes the tagging information available using any suitable technique. For example, the tagging information may be requested from the service provider 202 by third-party devices using one or more application programming interface ("API") calls (e.g., using one of the interfaces 232). For example, responsive to a request from one of the user devices 206, tagging information may be sent to the user device 206. In this manner, the service provider 202 functions as a tagging service. In some examples, the tagging information is made available to other components of the service provider 202. For example, the content streaming engine 104b may use the tagging information to build a customized content manifest that includes the tagging information. In some examples, the content manifest is generated by the content streaming engine 104b without accessing the tagging information.

The service provider 202 may also include additional storage 228, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 228, both removable and non-removable, is examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components, may refer to programming modules executed by computing systems (e.g., processors) that are part of the service provider 202 and/or part of the user device 206.

The service provider 202 may also include input/output (I/O) device(s) and/or ports 230, such as for enabling connection with a keyboard, a mouse, a pen, a voice input device, a touch input device, a display, speakers, a printer, or other I/O device.

In some examples, the service provider 202 may also include one or more user interface(s) 232. The user interface 232 may be utilized by an operator, curator, or other authorized user to access portions of the service provider 202. In some examples, the user interface 232 may include a graphical user interface, web-based applications, programmatic interfaces such as APIs, or other user interface configurations. The service provider 202 may also include the datastore 232. In some examples, the datastore 232 may include one or more databases, data structures, or the like for storing and/or retaining information associated with the service provider 202. Thus, the data store 232 may include data structures, such as a user information database 234 and a digital content database 236.

The user information database 234 may be used to retain information pertaining to users of the service provider 202 such as the user 210. Such information may include, for example, user preferences, user account information (e.g., electronic profiles for individual users), demographic information for users, payment instrument information for users (e.g., credit card, debit cards, bank account information, and other similar payment processing instruments), account preferences for users, purchase history of users, wish-lists of users, search histories for users, and other similar information pertaining to a particular user, and sets of users, of the service provider 202.

In some examples, the user preferences stored in the user information database 234 may be specific to particular user devices, to particular users, or to any combination of the foregoing. For example, the user 210 may be associated with a plurality of user devices of the user devices 206a-206N. In this example, the user 210 may be a master user and may create specific user preferences for each of the plurality of user devices 206 such that each of the plurality of user devices 206 are operable in accordance with its respective user preferences, which may be identified based on a user profile of the user 210. In this manner, the user preference may be fixed to the user device 206, irrespective of which user is accessing the user device 206. In some examples, the user 210 may set up master user preferences, which may be the default user preference when a new user device is associated with the user. This configuration for managing user preferences may be desirable when the master user is a parent and at least some of the user devices 206 that are associated with the master user are used by children of the master user.

In some examples, each of the users 210 may have their own user preferences (e.g., as part of a user profile) that may be portable between any of the user devices 206. Such user preferences may be associated with a particular user device 206 after the user 210 logs in to the user device 206 (e.g., logs into the content streaming engine 104) using user credentials. This configuration for managing user preferences may be desirable when each of the users 210 is capable of managing its own user preferences.

The digital content database 236 may include an expansive collection of digital content that is available for streaming now and in the future, and for viewing past recordings of live events. The digital content database 236 may be searchable by the user device 206 using any suitable application. In some examples, the digital content database 236 may include additional information that describes the particular digital content. For example, a record for an upcoming live event may indicate tag categories that may be used to generate the customized stream.

The content delivery network 204 is any suitable content delivery network that may be operated by the same entity that operates the service provider 202 or may be operated by a third party. In any event, the content delivery network 204 may be utilized to improve delivery of digital content streams to the user devices 206. In this manner, the content delivery networks 204 may operate in their conventional fashion.

Figure 3:
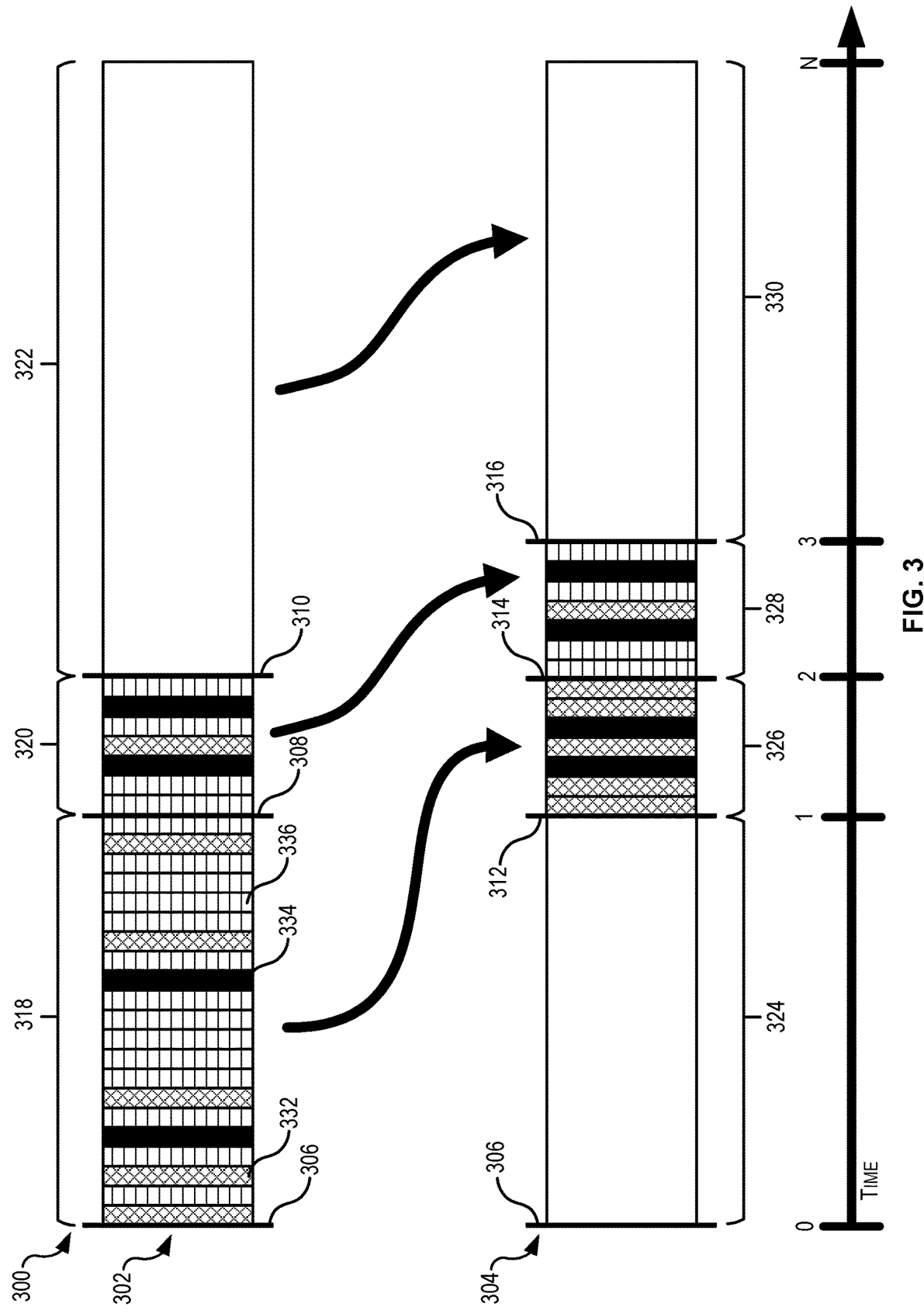
FIG. 3 is an example diagram illustrated an aspect of customized streaming of digital content, according to at least one example.

FIG. 3 is an example diagram 300 illustrated an aspect of customized streaming of digital content, according to at least one example. The diagram 300 may include a graphical depiction of a live content stream 302 and a customized content stream 304. The diagram 300 illustrates an approach for a user to catch up to a static live point that is established when the user first requests catching up of the live content stream 302 (e.g., to enter a catch-up mode on the user device). In this manner, the user may not catch up to a dynamic live point. This may be desirable in some instances to provide additional opportunities to present commercial content such as advertisements at the user device, even after the user has received the customized stream.

The live content stream 302 may include a real-time beginning point 306 (e.g., the beginning point 110) at which a live event corresponding to the live content stream 302 begins. In some examples, this point may be configurable. The live content stream 302 may also include a static live point 308 (e.g., static with respect to when a user requests the catch-up mode) and a dynamic live point 310.

The customized content stream 304 may include the real-time beginning point 306, a customized beginning point 312, a catch-up point 314, and a delayed live point 316. The customized beginning point 312 is the point in time when the user requests the catch-up mode. The catch-up point 314 is the point in time when the customized content stream 304 catches the static live point 308. In the example illustrated in FIG. 3, after the customized content stream 304 reaches the static live point 308, the live content stream 302 is delivered with a delay equivalent to the time it took for the live content stream 302 to reach the static live point 308.

For discussion purposes, the live content stream 302 may be divided into three portions: a previously streamed portion 318 from T0 to T1, an overlapping portion 320 from T1 to T2, and a future portion 322 from T2 to TN. Similarly, the customized content stream 302 may be divided into four portions: a past portion 324 from T0 to T1, a customized portion 326 from T1 to T2, a delayed overlapping portion 328 from T2 to T3, and a delayed future portion 330 from T3 to TN.

The content streams 302, 304 may include three types of segments: action segments 332 (illustrated with cross hatching), required segments 434 (illustrated as black fill), and non-action segments 436 (illustrated with horizontal hatching). At least a portion of these segments may be designated as such using content tags using the techniques described herein. In some examples, certain segments may already be tagged. For example, the required segments 434 may correspond to commercial and/or other advertisement segments that contractually must be displayed. These segments may be designated as such even before the tagging engine is used to tag the segments 332 and 336. While three segment types are illustrated, it should be understood that the live content stream 302 may be segmented using suitable number of segment types corresponding to categories and/or sub-categories of content. The segments may have any suitable length (e.g., seconds to many minutes, depending on the event).

The previously streamed portion 318 corresponds to a portion of the live content stream 302 that has already occurred when the catch-up mode is requested. The previously streamed portion 318 includes segments in the following order: action, non-action, action, non-action, required, non-action, action, non-action, non-action, non-action, non-action, non-action, required, non-action, action, non-action, non-action, non-action, non-action, action, non-action. These segments are continuous with respect to time. Upon a request for the catch-up mode, the segments from the previously streamed portion 318 may be condensed to create the customized portion 326 in the customized content stream 304. In the customized portion 326, the non-action segments 336 from the previously streamed portion 318 have been excluded. This has resulted in the action segments 332 and the required segments 334 in the customized portion 326 being presented in the same order as presented in the previously streamed portion 318, but being discontinuous with respect to each other (e.g., action, action, required, action, required, action, action). In the customized content stream 304, the segments 332 and 334 are presented continuously (e.g., one immediately following the other). In some examples, transition segments are inserted in between the segments of the customized portion 326. For example, a transition segment may include a screen fade, a flash, or some other indicator that informs the user that a segment change is occurring.

The overlapping portion 320 corresponds to a portion of the live content stream 302 that is presented during the time in which the customized portion 326 is presented in the customized content stream 304. Thus, the overlapping portion 320 may cover an equivalent amount of time as the time covered by the customized portion 326 and be delayed by this same amount of time. In FIG. 3, this is illustrated by the overlapping portion 320 including an equivalent number of segments as the customized portion 326 (e.g., seven segments). The segments from the overlapping portion 320 are presented in the customized content stream 304 in the delayed overlapping portion 328 following presentation of the segments in the customized portion 326. The segments presented in the delayed overlapping portion 328 may be presented in the same order and without removing any of the non-action segments 336.

In some examples, the non-action segments 336 and the required segments 334 are skipped in the customized portion 326, and only the non-action segments 336 are skipped in the delayed overlapping portion 328.

The future portion 322 includes segments that will be included in the live content stream 302 in the future. The delayed future portion 330 includes the same segments as the future portion 322, but presents these segments delayed with respect to time similarly as the delayed overlapping portion 328. Thus, when the customized stream 304 reaches the delayed live point 316, the user device may switch from the catch-up mode to a conventional streaming mode.

Figure 4:
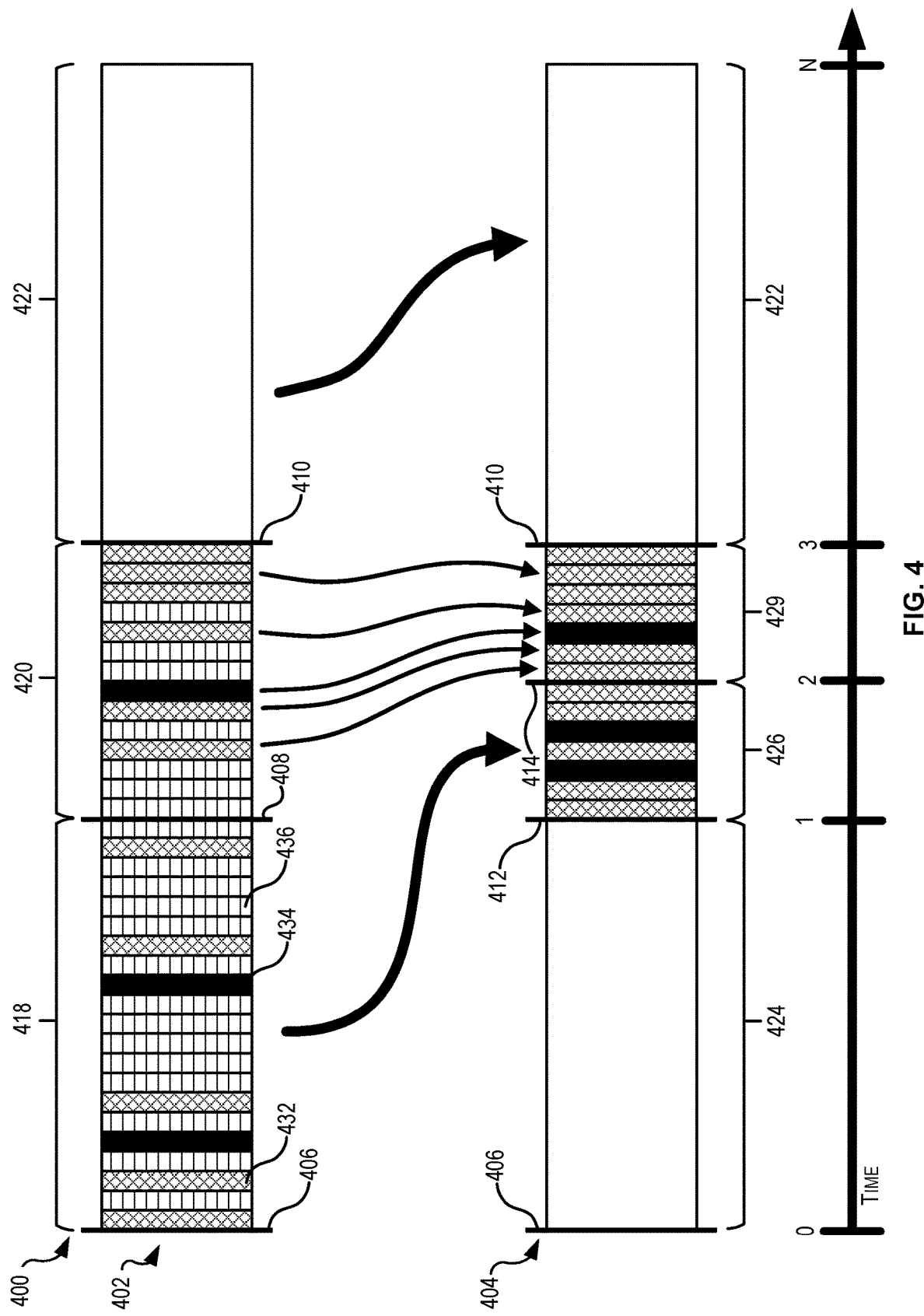
FIG. 4 is an example diagram illustrated an aspect of customized streaming of digital content, according to at least one example.

FIG. 4 is an example diagram 400 illustrated an aspect of customized streaming of digital content, according to at least one example. The diagram 400 may include a graphical depiction of a live content stream 402 and a customized content stream 404. The diagram 400 illustrates an approach for a user to catch up to a dynamic live point 410. In some examples, catching up to the dynamic live point 410 may depend on the live content stream 402 having enough time remaining for the customized content stream 402 to display the customized content. The customized content stream 404 may be established when the user first requests catching up of the live content stream 402 (e.g., to enter a catch-up mode on the user device). For example, the live content stream 402 may include a real-time beginning point 406 (e.g., the beginning point 110) at which a live event corresponding to the live content stream 402 begins. In some examples, this point may be configurable. The live content stream 402 may also include a static live point 408 (e.g., static with respect to when a user requests the catch-up mode) and the dynamic live point 410.

The customized content stream 404 may include the real-time beginning point 406, a customized beginning point 412, a catch-up point 414, and the dynamic live point 410. The customized beginning point 412 is the point in time when the user requests the catch-up mode. The catch-up point 414 is the point in time when the customized content stream 404 catches the static live point 408. In the example illustrated in FIG. 4, after the customized content stream 404 reaches the static live point 408, the customized content stream 404 continues to present a customized version of the live content stream 402 at least until the customized content stream 404 reaches the dynamic live point 410.

For discussion purposes, the live content stream 402 may be divided into three portions: a previously streamed portion 418 from T0 to T1, an overlapping portion 420 from T1 to T3, and a future portion 422 from T3 to TN. Similarly, the customized content stream 402 may be divided into four portions: a past portion 424 from T0 to T1, a first customized portion 426 from T1 to T2, a second customized portion 429 from T2 to T3, and the future portion 422 from T3 to TN.

The content streams 402, 404 may include three types of segments: action segments 432 (illustrated with cross hatching), required segments 434 (illustrated as black fill), and non-action segments 436 (illustrated with horizontal hatching). At least a portion of these segments may be designated as such using content tags using the techniques described herein. In some examples, certain segments may already be tagged. For example, the required segments 434 may correspond to commercial and/or other advertisement segments that contractually must be displayed. These segments may be designated as such even before the tagging engine is used to tag the segments 432 and 436. While three segment types are illustrated, it should be understood that the live content stream 402 may be segmented using suitable number of segment types corresponding to categories and/or sub-categories of content.

The previously streamed portion 418 corresponds to a portion of the live content stream 402 that has already occurred when the catch-up mode is requested. The previously streamed portion 418 includes segments in the following order: action, non-action, action, non-action, required, non-action, action, non-action, non-action, non-action, non-action, non-action, required, non-action, action, non-action, non-action, non-action, non-action, action, non-action. These segments are continuous with respect to time. Upon a request for the catch-up mode, the segments from the previously streamed portion 418 may be condensed to create the first customized portion 426 in the customized content stream 404. In the first customized portion 426, the non-action segments 436 from the previously streamed portion 418 have been excluded. This has resulted in the action segments 432 and the required segments 434 in the first customized portion 426 being presented in the same order as presented in the previously streamed portion 418, but being discontinuous with respect to each other (e.g., action, action, required, action, required, action, action). In the customized content stream 404, the segments 432 and 434 are presented continuously (e.g., one immediately following the other). In some examples, transition segments are inserted in between the segments of the first customized portion 426. For example, a transition segment may include a screen fade, a flash, or some other indicator that informs the user that a segment change is occurring.

The overlapping portion 420 corresponds to a portion of the live content stream 402 that is presented during the time in which the second customized portion 429 is presented in the customized content stream 404. Thus, the overlapping portion 420 may cover an equivalent amount of time as the time covered by the second customized portion 429. In FIG. 4, this is illustrated by the overlapping portion 420 including an equivalent number of required segments 434 and action segments 432 as totally included in the second customized portion 429 (e.g., seven segments). The segments from the overlapping portion 420 are presented in the customized content stream 404 in the second customized portion 429 following presentation of the segments in the first customized portion 426. The length of the second customized portion 429 may be sufficient to continue at least until the dynamic live point 410 is reached by the customized content stream 404.

The future portion 422 includes segments that will be included in the live content stream 402 in the future, which will be identical to those included in the customized content stream 404. Thus, when the customized stream 404 reaches the dynamic live point 410, the user device may switch from the catch-up mode to a conventional streaming mode.

Figure 5:
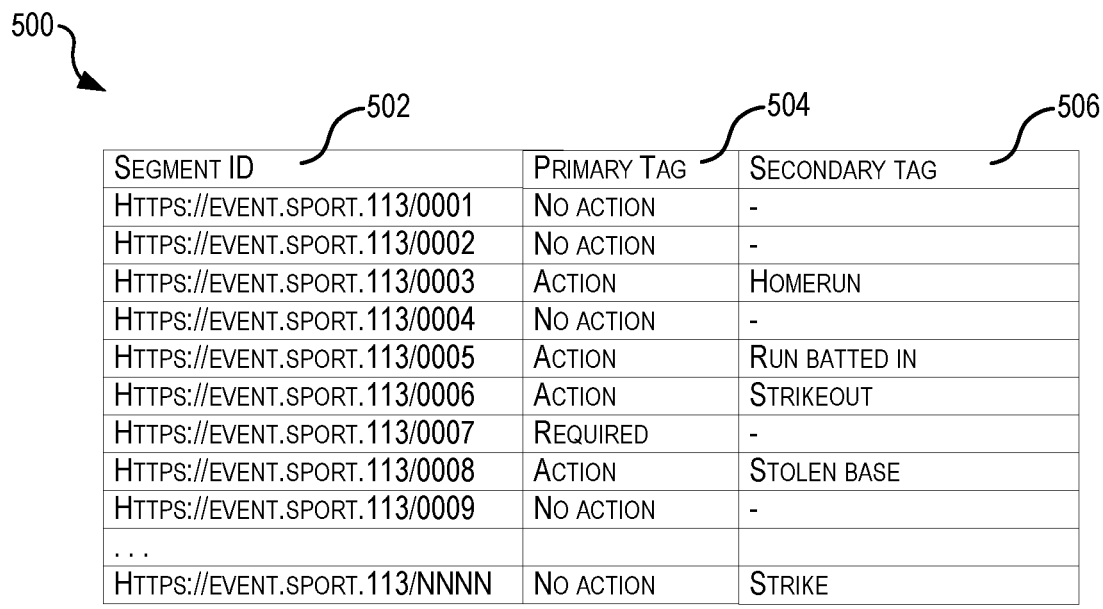
FIG. 5 is an example content manifest for customized streaming of digital content, according to at least one example.

FIG. 5 is an example content manifest 500 for customized streaming of digital content, according to at least one example. The content manifest 500 may include a segment identifier ("ID") column 502, a primary tag column 504, and a secondary tag column 506. As illustrated, the segment ID column 502 may identify a location where the particular segment is available for download. In this example, this segment ID is presented as a URL that identifies aspects of the event and uniquely identifies each segment. The primary tag column 504 includes a primary tag associated with each segment and the secondary tag column 504 includes a secondary tag, that when appropriate, is associated with each segment. In some examples, the secondary tags are sub-categories of primary tags. For example, the primary tag "Action" may indicate that the segment includes action, and the secondary tags may indicate what type of action (e.g., homerun, run batted in, strikeout, stolen base, strike, etc.). The customized content stream can be generated using any suitable combination of the primary tags, secondary tags, and any other tag. In some examples, the information from the primary tag column 504 and the secondary tag column 506 is considered tagging information. This tagging information may be included in the content manifest 500 as illustrated or may be shared in some other manner. For example, the tagging information can be downloaded from a tagging service separately from downloading of the content manifest.

Figure 6:
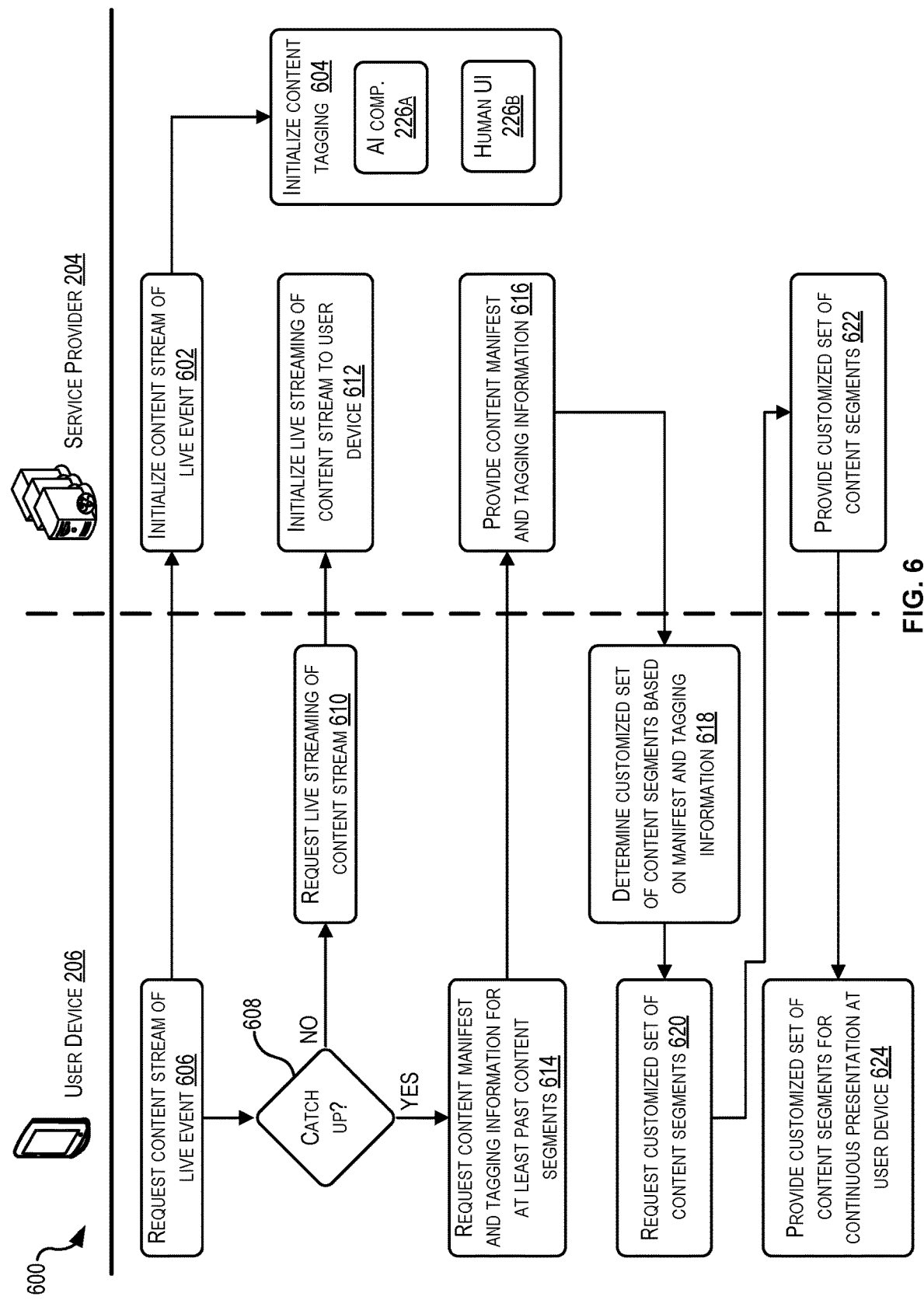
FIG. 6 is an example flow diagram depicting example acts for implementing techniques relating to customized streaming of digital content, according to at least one example.
Figure 7:
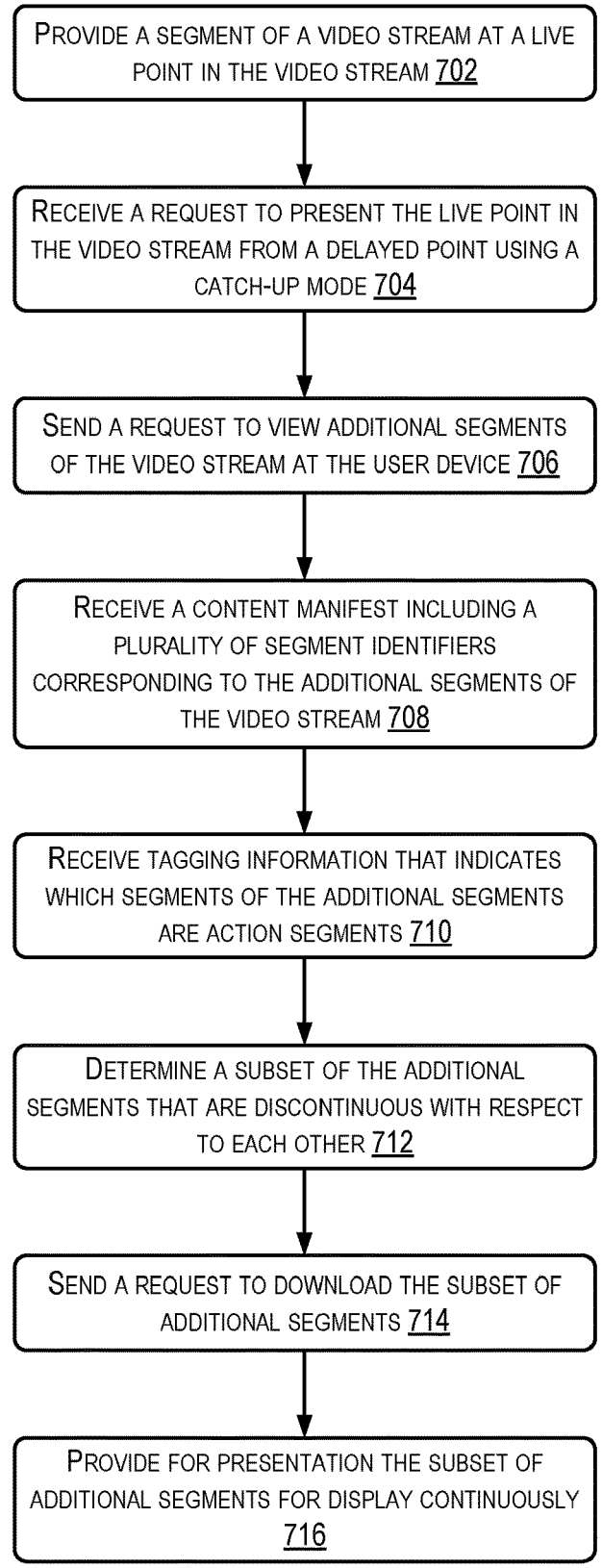
FIG. 7 is an example flow diagram depicting example acts for implementing techniques relating to customized streaming of digital content, according to at least one example.
Figure 8:
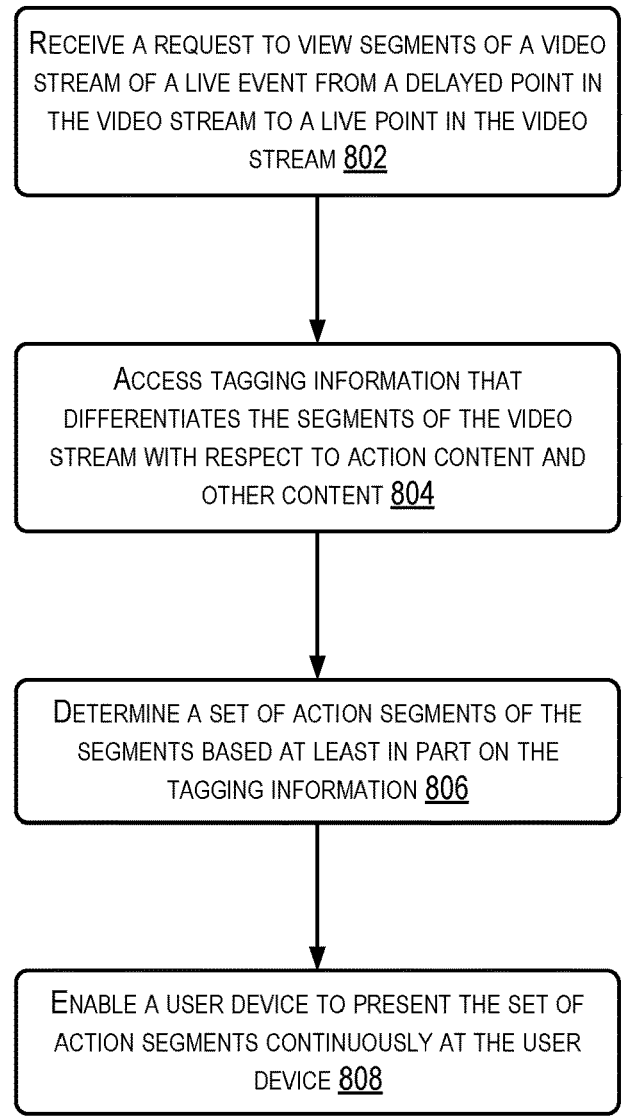
FIG. 8 is an example flow diagram depicting example acts for implementing techniques relating to customized streaming of digital content, according to at least one example.

FIGS. 6, 7, and 8 illustrate example flow diagrams showing respective processes 600, 700, and 800, as described herein. These processes 600, 700, and 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 6 is flow diagram of process 600 depicting example acts for implementing techniques relating to customized streaming of digital content, according to at least one example. The service provider 204 (FIG. 2) and/or the user device 206 (FIG. 2) may perform the process 600 of FIG. 6.

The process 600 may begin at 602 by initializing a content stream of a live event. This may be performed by the content streaming engine 104 (FIG. 1) embodied in the service provider 204. The service provider 204 may perform 602 without regard to a request from the user device 206. For example, this stream may be the live content stream that is received from a content originator and made available to all user devices associated with the service provider 204.

At 604, the process 600 may include initializing content tagging. This may be performed by the tagging engine 226 (FIG. 2) embodied in the service provider 204. Initializing the content tagging may include receiving the content stream of the live event and associating tags with the content stream. This may be performed using an AI component 226a as described herein and/or a human accessing a user interface 226b.

At 606, the process 600 may include requesting the content stream of the live event. This may be performed by the content streaming engine 104 (FIG. 1) embodied in the user device 206. In some examples, the request at 606 may be sent by the user device 206 after the live content stream has been initialized. In some examples, the request at 606 is a catch-up request or a request to view the content stream from a delayed point to a live point.

At 608, the process 600 may include determining whether to catch up to a live point in the content stream. This may be performed by the content streaming engine 104 embodied in the user device 206. Determining whether to catch up may be based on user input received at the user device 206 and/or whether sufficient time remains in the content stream for catching up. For example, after the request is sent at 606, a user interface element may be presented that asks whether the user desires to catch up to live or go live. If the answer at 608 is no, the process 600 continues to 610.

At 610, the process 600 may include requesting live streaming of the content stream. This may be performed by the content streaming engine 104 embodied in the user device 206. The request may be sent to the service provider 204. Thus, at 612, the process 600 may include initializing live streaming of the content stream to the user device. This may be performed by the content streaming engine 104 embodied in the service provider 204. In some examples, under this option, the stream will exclude all past segments. Thus, the user will miss out on action segments, non-action segments, and any other segments between when the event started and when the stream is first delivered to the user device 206. In some examples, under this option, the user views a delayed version of the content stream.

If the answer at 608 is yes, the process 600 continues to 614. At 614, the process 600 may include requesting a content manifest and tagging information for at least past segments. This may be performed by the content streaming engine 104 embodied in the user device 206. In some examples, the content manifest includes all past segments and the user device 206 resolves which segments to actually request and present. In some examples, a customized content manifest is generated by the service provider 204 and sent to the user device 206. In this example, less processing is required by the user device 206.

At 616, the process 600 may include providing the content manifest and the tagging information. This may be performed by the content streaming engine 104 embodied in the service provider 204.

At 618, the process 600 may include determining a customized set of content segments based at least in part on the manifest and the tagging information. This may be performed by the content streaming engine 104 embodied in the user device 206. The customized set of content segments may include segments identified in the tagging information as being action segments. The set of content segments may be a subset of the set of past content segments.

At 620, the process 600 may include requesting the set of customized content segments. This may be performed by the content streaming engine 104 embodied in the user device 206. The set of content segments may be requested from the service provider based on the determination at 618.

At 622, the process 600 may include providing the customized set of content segments. This may be performed by the content streaming engine 104 embodied in the service provider 204. In some examples, the set is sent in multiple communications including sub sets or may be provided as a single communication.

At 624, the process 600 may include providing the customized set of content segments for continuous presentation at the user device. This may be performed by the content streaming engine 104 embodied in the user device 206. The set may be provided to a display device associated with the user device 206. The set may be presented continuously even though they were originally discontinuously presented in the original content stream.

FIG. 7 is flow diagram of process 700 depicting example acts for implementing techniques relating to customized streaming of digital content, according to at least one example. The content streaming engine 104 (FIG. 1) embodied in the user device 206 (FIG. 2) may perform the process 700 of FIG. 7.

The process 700 may begin at 702 by providing a segment of a video stream at a live point in the video stream. The segment may be provided for presentation at a display device associated with a user device. The video stream may include a live sporting event or any other live event.

At 704, the process 700 may include receiving a request to present the live point in the video stream using a catch-up mode from a delayed point in the stream. In some examples, the request may be received at a user interface associated with the user device. The catch-up mode may be for enabling presentation of additional segments of the video stream from the delayed point to the live point.

In some examples, the live point includes a static point in time associated with a time of the request to present the live point, or a dynamic point in time associated with events of the live event occurring in real-time. In this example, the process 700 may further include switching from the catch-up mode to a different mode in response to providing for presentation at the user device a segment of the set of segments corresponding to the live point. In this example, the process 700 may further include providing for presentation individual segments of the video stream continuously when in the different mode, the individual segments comprising action segments, non-action segments, and required segments.

At 706, the process 700 may include sending a request to view the additional segments of the video stream at the user device. The request may be sent in the catch-up mode.

At 708, the process 700 may include receiving a content manifest comprising a plurality of segment identifiers corresponding to the additional segments of the video stream. The additional segments may include action segments and other segments of the live sporting event. In some examples, in the video stream, at least a portion of the other segments correspond to time gaps between individual segments of the subset of the additional segments.

At 710, the process 700 may include receiving tagging information that indicates which segments of the additional segments are the action segments. In some examples, the content manifest includes the tagging information. In some examples, receiving the tagging information is responsive to a request from the user device and to a tagging service for the tagging information. In some examples, the tagging information includes content tags associated with the segments. The content tags may be included in the content manifest or accessible from the tagging service.

At 712, the process 700 may include determining a subset of the additional segments that are discontinuous with respect to each other. This may be based at least in part on the tagging information and the content manifest. In some examples, determining the subset of additional segments is further based at least in part on setting information associated with the user device. The setting information may at least define desirable content. In some examples, determining the subset of additional segments is further based at least in part on an event category associated with the live event.

At 714, the process 700 may include sending a request to download the subset of the additional segments. The request may include a subset of the segment identifiers corresponding to the subset of additional segments. In some examples, the set of segments is downloaded by providing one or more requests to a content delivery network at which the set of segments is stored.

At 716, the process 700 may include providing for presentation the subset of additional segments continuously at the display device. This may be performed in response to receiving the subset of additional segments.

In some examples, the process 700 may further include determining a set of transition segments for transitioning between individual segments of the subset of additional segments, and in response to receiving the set of transition segments, providing for presentation, at the display device, the set of transition segments such that a first transition segment is presented prior to a first additional segment being presented and a second transition segment is presented after the first additional segment has been presented.

FIG. 8 is flow diagram of process 800 depicting example acts for implementing techniques relating to customized streaming of digital content, according to at least one example. The content streaming engine 104 (FIG. 1) embodied in the service provide 204 (FIG. 2) may perform the process 800 of FIG. 8.

The process 800 may begin at 802 by receiving a request to view segments of a video stream of a live event from a delayed point in the video stream to a live point in the video stream. In some examples, the request may be received from a user device after the live event has begun.

At 802, the process 800 may include accessing tagging information that differentiates the segments of the video stream with respect to action content and other content.

In some examples, the tagging information is generated in about real-time by a human user viewing the video stream and using a user interface to apply content tags to the segments of the video stream. In some examples, the tagging information is generated in about real-time by an artificial intelligence component accessing the video stream and applying content tags to the segments of the video stream.

In some examples, the other content may include required viewing content. In this example, the process 800 may further determining a set of required segments of the segments based at least in part on the tagging information, and enabling the user device to present the set of required segments discontinuously at the user device.

At 806, the process 800 may include determining a set of action segments of the segments based at least in part on the tagging information. The set of action segments may be discontinuous with respect to each other.

At 808, the process 800 may include enabling the user device to present the set of action segments continuously at the user device.

In some examples, enabling the user device to present the set of action segments may include storing the set of action segments at a computer system, and responsive to the request, sending a content manifest to the user device. The content manifest may include a set of segment identifiers that identify the set of action segments, and a set of location identifiers that identify locations on the computer system where the set of action segments is available for download.

In some examples, enabling the user device to present the set of action segments may include, responsive to a different request from the user device, providing a portion of the tagging information corresponding to the set of action segments to the user device. The user device may be configured to identify the set of action segments based at least in part on the portion of the tagging information.

Figure 9:
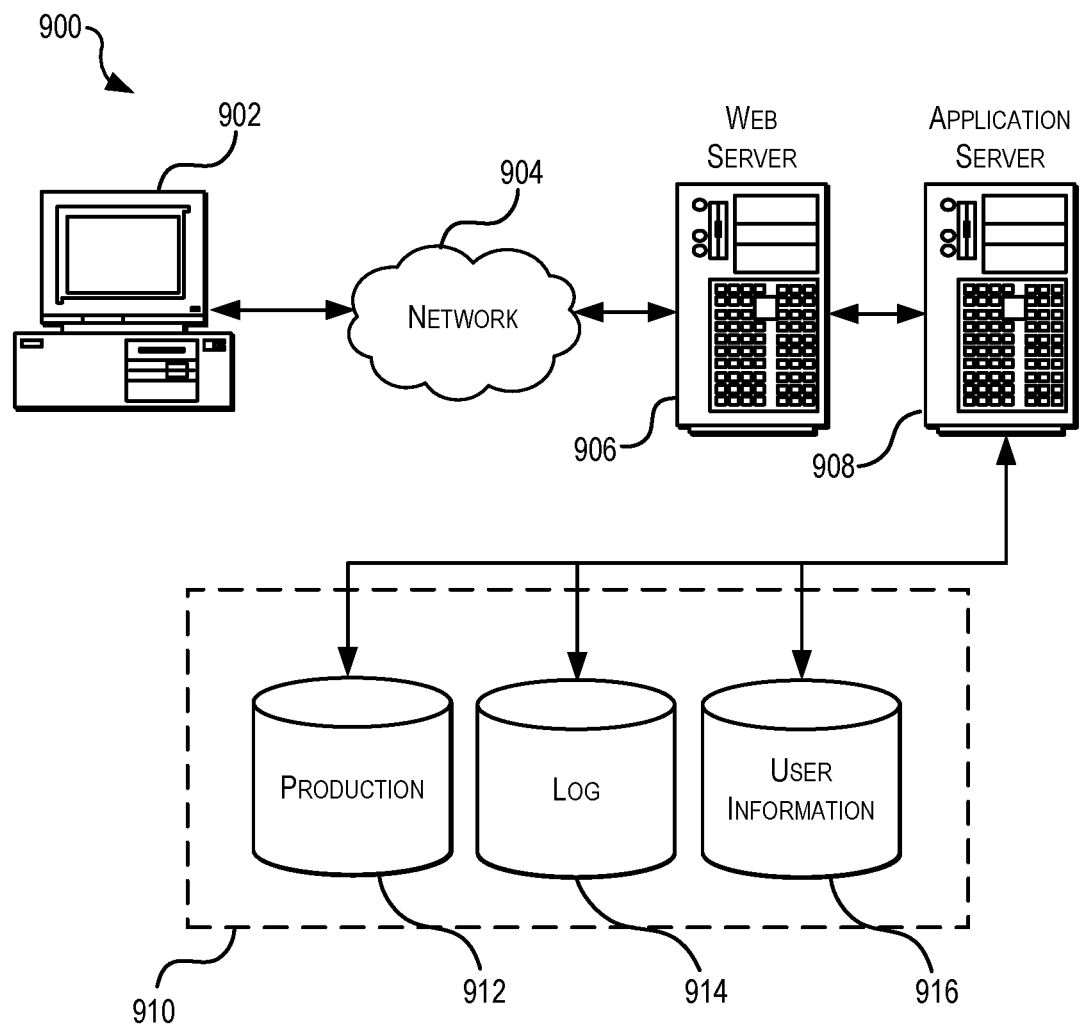
FIG. 9 is an example schematic environment for implementing techniques relating to customized streaming of digital content, according to at least one example.

In some examples, enabling the user device to present the set of action segments may include sending the set of action segments to the user device as a single package or as multiple packages FIG. 9 illustrates aspects of an example environment 900 for implementing aspects in accordance with various examples. As will be appreciated, although a Web-based environment is used for purposes of explanation, different environments may be used, as appropriate, to implement various examples. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server.

It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    providing, for presentation at a display device associated with a user device, a segment of a video stream at a live point in the video stream, the video stream comprising a live sporting event and wherein the live point occurs after the live sporting event has begun and before the live sporting event has ended;
    receiving, at a user interface associated with the user device, a request to present, from a delayed point in the video stream, the live point using a catch-up mode for enabling presentation of additional segments of the video stream from the delayed point to the live point;
    sending, in the catch-up mode, a request to view the additional segments of the video stream at the user device;
    receiving a content manifest comprising a plurality of segment identifiers corresponding to the additional segments of the video stream of the live sporting event, the additional segments comprising action segments and other segments;
    receiving tagging information that indicates which segments of the additional segments are the action segments;
    determining, based at least in part on the tagging information and the content manifest, a subset of the additional segments that are discontinuous with respect to each other;
    sending a request to download the subset of the additional segments, the request including a subset of the segment identifiers corresponding to the subset of the additional segments; and
    in response to receiving the subset of the additional segments, providing for presentation the subset of the additional segments continuously at the display device.

2. The computer-implemented method of claim 1, wherein the content manifest comprises the tagging information and receiving the tagging information is responsive to a request from the user device and to a tagging service for the tagging information.

3. The computer-implemented method of claim 1, wherein, in the video stream, at least a portion of the other segments correspond to time gaps between individual segments of the subset of the additional segments.

4. The computer-implemented method of claim 1, further comprising:
    determining a set of transition segments for transitioning between individual segments of the subset of the additional segments; and
    in response to receiving the set of transition segments, providing for presentation, at the display device, the set of transition segments such that a first transition segment is presented prior to a first additional segment being presented and a second transition segment is presented after the first additional segment has been presented.

5. A computer-implemented method, comprising:
    receiving, at a user interface associated with a user device, a request to present a live point in a video stream using a catch-up mode for enabling presentation of additional segments of the video stream from a delayed point in the video stream to the live point, the video stream corresponding to a live event, and wherein the live point occurs after the live event has begun and before the live event has ended;
    responsive to the request to view the video stream in the catch-up mode, sending a request to view segments of the video stream from the delayed point in the video stream to the live point in the video stream;
    receiving a content manifest comprising a plurality of segment identifiers corresponding to the segments of the video stream of the live event;
    receiving tagging information that differentiates the segments with respect to each other;
    determining, based at least in part on the tagging information and the content manifest, a set of segments of the segments that are discontinuous with respect to each other;
    downloading the set of segments based at least in part on a set of segment identifiers corresponding to the set of segments; and
    providing for presentation the set of segments continuously at the user device.

6. The computer-implemented method of claim 5, wherein downloading the set of segments comprises providing one or more requests to a content delivery network at which the set of segments is stored.

7. The computer-implemented method of claim 5, wherein the live event comprises a live sporting event.

8. The computer-implemented method of claim 5, wherein:
the live point in the video stream comprises:
a static point in time associated with a time of the request to present the live point; or
a dynamic point in time associated with events of the live event occurring in real-time; and
the method further comprises switching from the catch-up mode to a different mode in response to providing for presentation at the user device a segment of the set of segments corresponding to the live point.

9. The computer-implemented method of claim 8, further comprising providing for presentation individual segments of the video stream continuously when in the different mode, the individual segments comprising action segments, non-action segments, and required segments.

10. The computer-implemented method of claim 5, wherein determining the set of segments is further based at least in part on setting information associated with the user device, the setting information at least defining desirable content.

11. The computer-implemented method of claim 5, wherein determining the set of segments is further based at least in part on an event category associated with the live event.

12. The computer-implemented method of claim 5, wherein the tagging information comprises content tags associated with the segments, the content tags being included in the content manifest or accessible from a tagging service.

13. A system, comprising:
a processor; and
a memory comprising computer-executable instructions that, when executed by the processor, cause one or more computer systems to at least:
receive, from a user device, after a live event has begun and before the live event has ended, a request to view segments of a video stream of the live event from a delayed point in the video stream to a live point in the video stream;
access tagging information that differentiates the segments of the video stream with respect to action content and other content;
determine a set of action segments of the segments based at least in part on the tagging information, the set of action segments being discontinuous with respect to each other; and
enable the user device to present the set of action segments continuously at the user device.

14. The system of claim 13, wherein enabling the user device to present the set of action segments comprises:
storing the set of action segments at a computer system; and
responsive to the request, sending a content manifest to the user device, the content manifest comprising:
a set of segment identifiers that identify the set of action segments; and
a set of location identifiers that identify locations on the computer system where the set of action segments is available for download.

15. The system of claim 13, wherein enabling the user device to present the set of action segments comprises responsive to a different request from the user device, providing a portion of the tagging information corresponding to the set of action segments to the user device, the user device configured to identify the set of action segments based at least in part on the portion of the tagging information.

16. The system of claim 13, wherein enabling the user device to present the set of action segments comprises sending the set of action segments to the user device as a single communication or as multiple communications.

17. The system of claim 13, wherein the tagging information is generated in about real-time by at least one of:
a human user viewing the video stream and using a user interface to apply content tags to the segments of the video stream; or
an artificial intelligence component accessing the video stream and applying content tags to the segments of the video stream.

18. The system of claim 13, wherein:
the other content comprises required viewing content; and
the computer-executable instructions further include instructions that, when executed by the processor, cause the one or more computer systems to at least:
determine a set of required segments of the segments based at least in part on the tagging information; and
enable the user device to present the set of required segments discontinuously at the user device.

19. The system of claim 13, wherein the live point in the video stream changes with respect to time, and wherein the computer-executable instructions further include instructions that, when executed by the processor, cause the one or more computer systems to at least:
determine additional action segments of the video stream; and
enable the user device to present the additional action segments at the user device after enabling the user device to present the set of action segments at the user device.

20. The system of claim 19, wherein the set of action segments correspond to a period of time between the delayed point and a present point, and the additional action segments correspond to a period of time between the present point and the live point.

* * * * *